Figure 1:
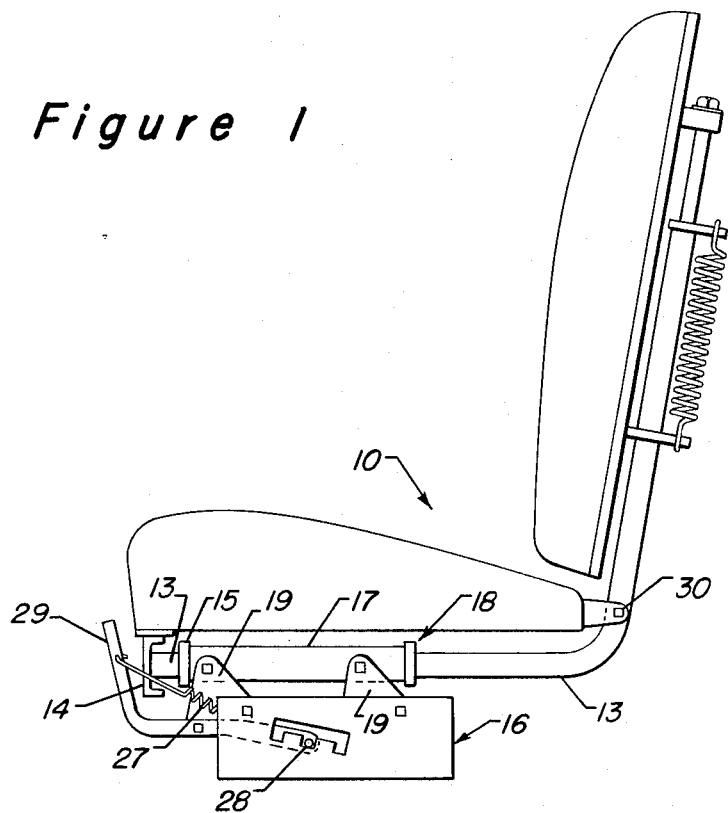

United States Patent

Radke

[15] 3,692,272
[45] Sept. 19, 1972

[54] SLIDE RAIL ASSEMBLY FOR A VEHICLE SEAT
[72] Inventor: Arthur O. Radke, 133 W. Oregon St., Milwaukee, Wis. 53204
[22] Filed: Nov. 30, 1970
[21] Appl. No.: 93,674

[52] U.S. Cl. ............................ 248/429, 108/3.5
[51] Int. Cl. ................... B60n 1/02, F16c 29/08
[58] Field of Search .......... 248/429, 420; 308/3.5; 297/344, 346

[56] References Cited

UNITED STATES PATENTS

| | | | |
|---|---|---|---|
| 1,877,769 | 9/1932 | Knapp | 297/346 |
| 2,670,987 | 3/1954 | Walsh | 248/429 |
| 2,950,149 | 8/1960 | Thomson | 308/4 R |
| 3,188,045 | 6/1965 | Flowler et al. | 248/429 |
| 3,527,507 | 9/1970 | Clark et al. | 308/3.5 |
| 3,568,972 | 3/1971 | Sherman | 248/429 |

FOREIGN PATENTS OR APPLICATIONS

| | | | |
|---|---|---|---|
| 699,612 | 11/1953 | Great Britain | 297/346 |
| 695,522 | 10/1964 | Canada | 308/3.5 |
| 553,339 | 6/1932 | Germany | 248/429 |
| 164,072 | 12/1933 | Switzerland | 297/344 |

*Primary Examiner*—Marion Parsons, Jr.
*Attorney*—James R. Hoatson, Jr. and Charles H. Thomas, Jr.

[57] ABSTRACT

An improved slide rail assembly in a vehicle seat for moving a vehicle seat cushion assembly relative to a vehicle seat base assembly. The slide rail assembly has shaft members and sleeve members slideably engaged and interposed between the cushion and base assemblies. Annular wiper members are fastened to the ends o the sleeve members in continuous contact with the shaft members, thereby forming sliding seals between the shaft members and the sleeve members.

2 Claims, 2 Drawing Figures

PATENTED SEP 19 1972 3,692,272

INVENTOR:
Arthur O. Radke

BY: James R. Hoatson, Jr.
Charles H. Thomas, Jr.
ATTORNEYS

SLIDE RAIL ASSEMBLY FOR A VEHICLE SEAT

This invention relates to an improved slide rail assembly in a vehicle seat for moving a vehicle seat cushion assembly relative to a vehicle seat assembly. More particularly, the slide rail assembly has shaft members and sleeve members slideably engaged and interposed between the cushion and base assembly. Annular wiper members are fastened to the ends of the sleeve members in continuous contact with the shaft members, thereby forming sliding seals between the shaft members and the sleeve members.

Slide rail assemblies utilizing shaft members working within sleeve members have long been utilized in vehicle seating. Such assemblies provide an economical and simple means for facilitating longitudinal adjustment of the seat cushion in the vehicle. Conventional slide rail assemblies have been plagued by some longstanding disadvantages, however. There is a tendency for dirt and other foreign material to enter and become trapped within the sleeve members. This foreign material is carried into the sleeve members either through external forces or by collecting on and adhering to the shaft members. Once inside the sleeve members, the dirt or other foreign material frequently becomes trapped therein. The resulting build up of foreign material tends to hinder the longitudinal relative movement between the shaft members and the sleeve members. Moreover, it sometimes causes complete jamming of the slide rail mechanism by obstructing the free passage of the shaft members through the sleeve members. Furthermore, water is sometimes carried into the sleeve members where it becomes trapped and creates rust both on the sleeve members and on the shaft members. Such rusting allows longitudinal adjustment of the cushion assembly only with great difficulty and with unpleasant grating sounds. Rusting and jamming of the slide rail mechanism is particularly prevalent in the seats of heavy duty vehicles, such as earth moving equipment. In such an environment, dirt, water, and other foreign material is very likely to enter and adhere to the slide rail members unless the structure of this invention is utilized.

The improved slide rail assembly of this invention overcomes the aforementioned problems by providing a complete and continuous seal between the interior of the sleeve members and the exterior thereof. Dirt, water, and other foreign matter is thereby never allowed to enter the sleeve members. In addition, in the preferred embodiment of this invention, the annular wipers terminate in inner annular lips extending away from the sleeve members and in continuous contact with the surfaces of the shaft members. These inner lips more effectively scoop or squeegee water off of the shaft members and thereby prevent rusting of the mechanism both inside of the sleeve members and on the external portions of the shaft members. All of the advantages enumerated herein are achieved with an inexpensive modification to existing slide rail assemblies.

In a broad aspect this invention is in a slide rail assembly interposed between a vehicle seat base assembly and a vehicle seat cushion assembly for relative longitudinal adjustment of the cushion assembly with respect to the base assembly, the improvement wherein said slide rail assembly is comprised of longitudinal sleeve members having ends and fastened to a first of said seat base and seat cushion assemblies, longitudinal shaft members fastened to a second of said seat base and seat cushion assemblies and slideably mounted within said sleeve members, and annular wiper members fastened to the ends of said sleeve members and in continuous contact with said shaft members, thereby forming sliding seals between said shaft members and said sleeve members.

It is advantageous to construct the wiper members of this invention with annular lips extending away from the sleeve members and in continuous contact with the surfaces of the shaft members. The lips are preferably constructed of a low friction, non-porous material such as polyethylene or polytetrafluoroethylene. Such materials are backed by a rigid material, such as steel, to provide stability for the annular lips at the surfaces of contact with the shaft members. To further reduce rusting and lower the coefficient of friction between the wiper members and the shaft members, the shaft members are often plated with an alloy comprised of nickel and steel. As in conventional seat assemblies, the shaft members are frequently fastened to either the seat base or the seat cushion assembly at connections that are longitudinally displaced from the sleeve member at both ends of the sleeve members.

Figure 2:
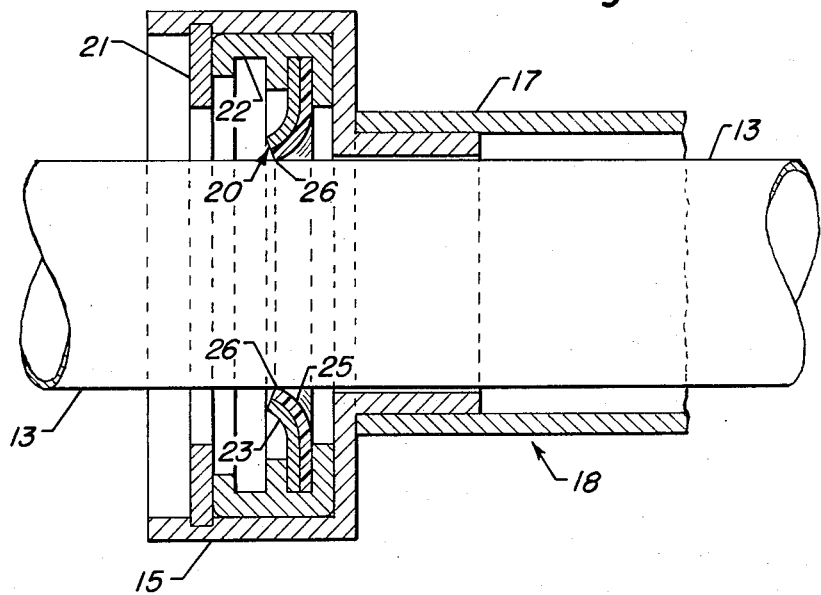

The features of this invention are more fully illustrated in the accompanying drawings in which:

FIG. 1 is a side elevational view of a vehicle seat utilizing this invention, and FIG. 2 is a magnified sectional side elevational view of a portion of FIG. 1.

FIG. 1 illustrates a vehicle seat incorporating the preferred embodiment of this invention. The vehicle seat is comprised of a vehicle seat cushion assembly 10 and a vehicle seat base assembly 16. The seat cushion assembly 10 is fastened to the seat base assembly 16 by means of rotatable triangular links 19 which allow the seat to be vertically adjusted. The seat cushion assembly 10 and the slide rail assembly of this invention are locked at different vertical levels by latching pin 28. The seat cushion assembly 10 and slide rail assembly are biased upward by a spring (not visible) fastened in tension between the rear triangular link 19 and the forward portion of the seat base assembly 16. A latching lever 29 carries latching pin 28 at one end and is pivoted about the forward triangular link 19 and extends upward within easy reach of the seat occupant. A spring 27 biases the latching lever 29 backwards in a clockwise direction thereby forcing latching pin 28 into one of the slots in the seat base assembly 16. The seat is raised or lowered by pushing latching handle 29 forward and moving the seat cushion assembly 10 and the slide rail assembly upward or downward to a desired location. The latching handle 29 is then released and the seat cushion assembly 10 is thereby locked in a new vertical location.

The slide rail assembly of this invention is interposed between the base assembly 16 and cushion assembly 10. The slide rail assembly is comprised of longitudinal sleeve members 18 fastened to the rotatable links 19, which in turn are fastened to the base assembly 16. The slide rail assembly is also comprised of shaft members 13. The forward portions of shaft members 13 are longitudinally aligned and are fastened to the cushion assembly 10 by a cross member 14 at the front of the vehicle seat and by another cross member secured between shaft members 13 by bolts 30. These cross members form connections longitudinally displaced from the sleeve members 18 at both ends thereof in any relative position of the cushion assembly 10 with respect to the base assembly 16. The rear portions of shaft members 13 curve upwardly and provide a support frame for the back portion of the seat cushion assembly 10. The back cushion of the seat is attached to the upright portions of shaft members 13 which are stabilized in a conventional manner.

The shaft members 13 are slideably mounted within the sleeve members 18 and FIG. 2 illustrates the forward end of one of the sleeve members 18 and the portion of the shaft member 13 adjacent thereto. It can be seen that each of the sleeve members 18 is comprised of a central shank 17 and an end collar 15 at each end of the shank 17. The end collars 15 are force fitted into the shanks 17 and house annular wiper members positioned in continuous contact with the shaft members 13. The annular wiper members are each comprised of an annular frame 22 within which is secured a lip member 20. Lip member 20 is formed with a lip 25 of polyethylene or polytetrafluoroethylene in continuous contact with a shaft member 13 at a line of continuous contact 26 extending circumferentially around the shaft member 13. The back side of lip 25 is reinforced with an annular steel stabilizing ring 23. As illustrated, the lip member 20 extends away from the interior of the sleeve member 18, thereby acting as a scoop to undercut and dislodge water, dirt, or any other foreign material adhering to the shaft member 13 as the shaft member 13 passes through the sleeve member 18. The lip and shaft member are dimensioned so that the lip member 20 exerts a slight pressure on the shaft member 13, thereby forming a sliding seal between the shaft member 13 and the sleeve member 18. It can be seen that as the cushion assembly 10 is moved forward with respect to the base assembly 16, the rearmost wiper members dislodge any foreign material adhering to the shaft members 13. Conversely, when the cushion assembly 10 is adjusted rearwards with respect to the base assembly 16, it is the forward wiper members that dislodge foreign material from the shaft members 13.

While the frame 22, the lip 25, and the stabilizing ring 23 have all been depicted as separate structures, some or all of these members can be integrally formed with the end collar 15. In addition, the lip 25 may be formed from a variety of materials and the examples used should not be considered limiting. For example, lip 25 could also be formed of leather, nylon, plated steel, or other materials. Similarly, the shaft members 13 may be formed from a wide variety of materials, such as plastic tubing, aluminum, stainless steel, and numerous other substances.

The foregoing description and illustrations of the improved slide rail assembly of this invention have been given for the purposes of illustration and understanding only, and modifications in addition to those enumerated will be obvious to those familiar with slide rail assemblies. For example, the sleeve members 18 could be fastened to the cushion assembly 10 while the forward and generally horizontal portions of shaft members 13 could be fastened to the base assembly 16.

I claim as my invention:

1. In a slide rail assembly interposed between a vehicle seat base assembly and a vehicle seat cushion assembly for relative longitudinal adjustment of the cushion assembly with respect to the base assembly, the improvement wherein said slide rail assembly is comprised of longitudinal sleeve members having outer ends and fastened to a first of said seat base and seat cushion assemblies, longitudinal shaft members fastened to a second of said seat base and seat cushion assemblies and slidably mounted within said sleeve members, said longitudinal sleeve members each including an inner axially extending bearing portion for slidably mounting one of said shaft members and an outer axially extending recessed portion formed in an integral axial extension of said bearing portion, an annular wiper member mounted in said recessed portion inwardly of the ends of said sleeve member and adjacent said bearing portion, said annular wiper member including a curved annular lip portion which is curved so as to extend in a generally axially outward direction, said annular wiper member being mounted in an annular retaining frame which is removably positioned in said recessed portion by retainer means so that said curved lip portion is in continuous engagement with said one of said shaft members, thereby forming sliding seals between said shaft members and said sleeve members.

2. The slide rail assembly of claim 1 wherein said shaft members are fastened to said second of said seat base and seat cushion members at connections longitudinally displaced from said sleeve members at both ends of each of said sleeve members.

* * * * *